US008635705B2

(12) United States Patent
Sahita et al.

(10) Patent No.: US 8,635,705 B2
(45) Date of Patent: Jan. 21, 2014

(54) COMPUTER SYSTEM AND METHOD WITH ANTI-MALWARE

(75) Inventors: Ravi L. Sahita, Beaverton, OR (US); David M. Durham, Beaverton, OR (US); Steve Orrin, Santa Clara, CA (US); Yasser Rasheed, Beaverton, OR (US); Prasanna G. Mulgaonkar, Saratoga, CA (US); Paul S. Schmitz, North Plains, OR (US); Hormuzd M. Khosravi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 529 days.

(21) Appl. No.: 12/658,876

(22) Filed: Feb. 17, 2010

(65) Prior Publication Data

US 2011/0078799 A1    Mar. 31, 2011

Related U.S. Application Data

(60) Provisional application No. 61/277,532, filed on Sep. 25, 2009.

(51) Int. Cl.
*G06F 11/30* (2006.01)
*G06F 12/14* (2006.01)
*G06F 12/16* (2006.01)
*G08B 23/00* (2006.01)

(52) U.S. Cl.
USPC ............................. 726/26; 713/181; 713/193

(58) Field of Classification Search
USPC ..................................... 713/181, 193; 726/26
See application file for complete search history.

(56) References Cited

U.S. PATENT DOCUMENTS

| 7,254,133 | B2 | 8/2007 | Govindarajan et al. |
| 7,536,479 | B2 | 5/2009 | Sahita et al. |
| 7,558,966 | B2 | 7/2009 | Durham et al. |
| 7,739,517 | B2 | 6/2010 | Sahita et al. |
| 7,797,749 | B2 | 9/2010 | Rajagopal et al. |
| 7,882,318 | B2 | 2/2011 | Savagaonkar et al. |
| 8,225,317 | B1* | 7/2012 | Chiueh et al. ................ 718/1 |
| 2004/0193912 | A1 | 9/2004 | Li et al. |
| 2004/0230794 | A1* | 11/2004 | England et al. ............ 713/164 |
| 2005/0071668 | A1 | 3/2005 | Yoon et al. |

(Continued)

FOREIGN PATENT DOCUMENTS

| JP | 2004-171412 A | 6/2004 |
| JP | 2007-226277 A | 9/2007 |

(Continued)

OTHER PUBLICATIONS

DMTF. "Systems Management Architecture for Mobile and Desktop Hardware White Paper", 2007.*

(Continued)

*Primary Examiner* — Michael Simitoski
(74) *Attorney, Agent, or Firm* — Erik R. Nordstrom

(57) ABSTRACT

In some embodiments, approaches may provide an out-of-band (OOB) agent to protect a platform. The OOB agent may be able to use non-TRS methods to measure and protect an in-band security agent. In some embodiments, a manageability engine can provide out of band connectivity to the in-band and out-of-band security agents and provide access to the system memory resources without having to rely on OS services. This can be used for a trusted anti-malware and remediation service.

14 Claims, 4 Drawing Sheets

(56) References Cited

U.S. PATENT DOCUMENTS

| | | | |
|---|---|---|---|
| 2005/0216759 A1* | 9/2005 | Rothman et al. | 713/200 |
| 2006/0095551 A1* | 5/2006 | Leung et al. | 709/223 |
| 2006/0095961 A1* | 5/2006 | Govindarajan et al. | 726/15 |
| 2006/0136720 A1* | 6/2006 | Armstrong et al. | 713/164 |
| 2007/0002994 A1 | 1/2007 | Kanter et al. | |
| 2007/0005992 A1* | 1/2007 | Schluessler et al. | 713/193 |
| 2007/0011491 A1* | 1/2007 | Govindarajan et al. | 714/27 |
| 2007/0033311 A1* | 2/2007 | Young et al. | 710/107 |
| 2007/0073800 A1* | 3/2007 | Rothman et al. | 709/202 |
| 2007/0162955 A1* | 7/2007 | Zimmer et al. | 726/2 |
| 2007/0294465 A1* | 12/2007 | Weksler et al. | 711/100 |
| 2008/0005359 A1 | 1/2008 | Khosravi et al. | |
| 2008/0016313 A1* | 1/2008 | Murotake et al. | 711/173 |
| 2008/0022129 A1 | 1/2008 | Durham et al. | |
| 2008/0083030 A1* | 4/2008 | Durham et al. | 726/22 |
| 2008/0141350 A1* | 6/2008 | Merkin et al. | 726/5 |
| 2008/0148390 A1* | 6/2008 | Zimmer et al. | 726/17 |
| 2008/0162809 A1* | 7/2008 | Rothman et al. | 711/114 |
| 2008/0162849 A1 | 7/2008 | Savagaonkar et al. | |
| 2008/0163373 A1* | 7/2008 | Maynard | 726/25 |
| 2008/0184373 A1* | 7/2008 | Traut et al. | 726/26 |
| 2008/0240446 A1 | 10/2008 | Ling et al. | |
| 2008/0244114 A1* | 10/2008 | Schluessler et al. | 710/24 |
| 2008/0244257 A1* | 10/2008 | Vaid et al. | 713/2 |
| 2008/0244268 A1 | 10/2008 | Durham et al. | |
| 2008/0244758 A1 | 10/2008 | Sahita et al. | |
| 2008/0282358 A1 | 11/2008 | Savagaonkar et al. | |
| 2009/0007100 A1* | 1/2009 | Field et al. | 718/1 |
| 2009/0038017 A1 | 2/2009 | Durham et al. | |
| 2009/0070467 A1 | 3/2009 | Khosravi et al. | |
| 2009/0070574 A1* | 3/2009 | Rothman et al. | 713/2 |
| 2009/0089497 A1* | 4/2009 | Bulygin et al. | 711/112 |
| 2009/0158432 A1* | 6/2009 | Zheng et al. | 726/24 |
| 2009/0165099 A1* | 6/2009 | Eldar et al. | 726/5 |
| 2009/0172328 A1 | 7/2009 | Sahita et al. | |
| 2009/0172814 A1* | 7/2009 | Khosravi et al. | 726/23 |
| 2009/0328042 A1* | 12/2009 | Khosravi et al. | 718/100 |
| 2010/0083381 A1* | 4/2010 | Khosravi et al. | 726/24 |
| 2010/0169967 A1 | 7/2010 | Khosravi et al. | |
| 2010/0325729 A1 | 12/2010 | Khosravi et al. | |
| 2011/0078791 A1 | 3/2011 | Prakash et al. | |

FOREIGN PATENT DOCUMENTS

| | | |
|---|---|---|
| JP | 2009-181373 A | 8/2009 |
| JP | 2009-187134 A | 8/2009 |
| KR | 10-2008-0029949 A | 4/2008 |
| WO | 2008/091452 A1 | 7/2008 |

OTHER PUBLICATIONS

Talwar, Vanish and Partha Ranganathan. "Closely Coupled Operating System Pairs for Emerging Manageability Architectures", 2007.*

Office action received for Korean Patent Application No. 10-2010-92731, mailed on Apr. 30, 2012, 3 pages of Korean office action and 3 pages of English Translation.

Office action received for Japanese Patent Application No. 2010-173785, mailed on Mar. 21, 2012, 2 pages of Japanese office action and 2 pages of English Translation.

Horikoshi Isao, Strategic Network Research, Fuji Film, Nikkei Communications, vol. 493, Japan, Nikkei Business Publication Inc. Sep. 1, 2007, pp. 82-85.

Search Report for European Patent Application No. 10251520.2, mailed on Feb. 8, 2011, 5 pages of European Search Report.

Khosravi et al., "Secure Local Boot Using Third Party Data Store (3pds) Based ISO Imagen" U.S. Appl. No. 12/970,698, filed Dec. 16, 2010, 32 pages.

Naidu et al., "Providing Authenticated Anti-Virus Agents A Direct Access To Scan Memory", U.S. Appl. No. 12/609,961, mailed on Oct. 30, 2009, 27 pages.

Edwards et al., "Secure Out-Of-Band Storage Control", U.S. Appl. No. 12/646,692, mailed on Dec. 23, 2009, 28 pages.

Durham et al., "Systems And Methods For Secure Host Resource Management", U.S. Appl. No. 12/987,813, mailed on Jan. 11, 2011, 31 pages.

Prakash et al., "Automated Modular and Secure Boot Firmware Update", U.S. Appl. No. 12/592,605, mailed on Nov. 30, 2009, 48 pages.

McKeen et al., "Method and Apparatus to Provide Secure Application Execution", U.S. Appl. No. 12/590,767, mailed on Nov. 13, 2009, 13 pages.

Yang et al., "Using Hypervisor to Provide Data Secrecy for User Applications on a Per-p. Basis", Vee 08, Mar. 5-7, 2008, 10 pages.

"Intel Active Management Technology", Wikipedia, the free encyclopedia, Sep. 15, 2009, 11 pages, webpage available at: "http://en.wikipedia.org/w/index.php?titleeIntel.Activa.Manaqement.,Technology&oldid=314056304".

"Intel® Active Management Technology System Defense and Agent Presence Overview", Version 3.0.4, Feb. 2007, pp. 1-26.

Office action received for European Patent Application No. 10251520.2, mailed on Mar. 1, 2011, 5 pages of European office action.

Office action received for Japanese Patent Application No. 2010-173785, mailed on Jul. 17, 2012, 2 pages of Japanese office action and 2 pages of English Translation.

Office action received for European Patent Application No. 10251520.2, mailed on Oct. 25, 2012, 14 pages of European office action.

Office Action received for Chinese Patent Application No. 201010507771.1, mailed on Jan. 28, 2013, 9 pages of Chinese Office Action and 14 pages of English Translation.

Office action received for European Patent Application No. 12008387.8, mailed on Jun. 4, 2013, 6 pages of European office action.

European Search Report Received for European Patent Application No. 12008387.8, mailed on May 22, 2013, 5 pages.

* cited by examiner

COMPUTER SYSTEM AND METHOD WITH ANTI-MALWARE

This application claims benefit from earlier filed provisional application No. 61/277,532 filed on Sep. 25, 2009.

BACKGROUND

Malware (or malicious code) is a catch-all term used to refer to various types of software that can cause problems or damage a computer. It encompasses viruses, worms, Trojan horses, macro viruses, and backdoors. Malware has evolved to be increasingly more stealthy and targeted. Anti-malware techniques have also evolved to understand and redress the stealthy behavior of malware. Current approaches to anti-malware use tamper-resistant software (TRS) mechanisms to protect their in-band security agents (within the confines of an operating platform operating system) in system memory. Such approaches, however, themselves, are susceptible to software attacks and thus may be flawed. Accordingly, new approaches for protecting platforms against malware may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

It has been observed that conventional anti-malware solutions do not generally have secure execution environments. They also may not have trusted visibility into the operating system they are trying to secure. For example, traditional anti-malware applications may rely on the operating system (OS), itself, to make system calls in order to get files and file portions from memory. Unfortunately, malware can subvert these channels because they can operate within the OS. Accordingly, new approaches may be desired.

In some embodiments, approaches may provide an out-of-band (OOB) agent to protect a platform. The OOB agent may be able to use non-TRS methods to measure and protect an in-band security agent. In some embodiments, a manageability engine can provide out of band connectivity to the in-band and out-of-band security agents and provide access to the system memory resources without having to rely on OS services. This can be used for a trusted anti-malware and remediation service.

Different embodiments of the invention may incorporate any combination of some or all of the following features: (1) protected execution environment and guaranteed execution of a local security agent, (2), trusted systems visibility and eventing capability available to a local security agent, (3) out of band (OOB) channel to interact with a remote security agent, (4) OOB persistent storage for local security agents.

Figure 1:
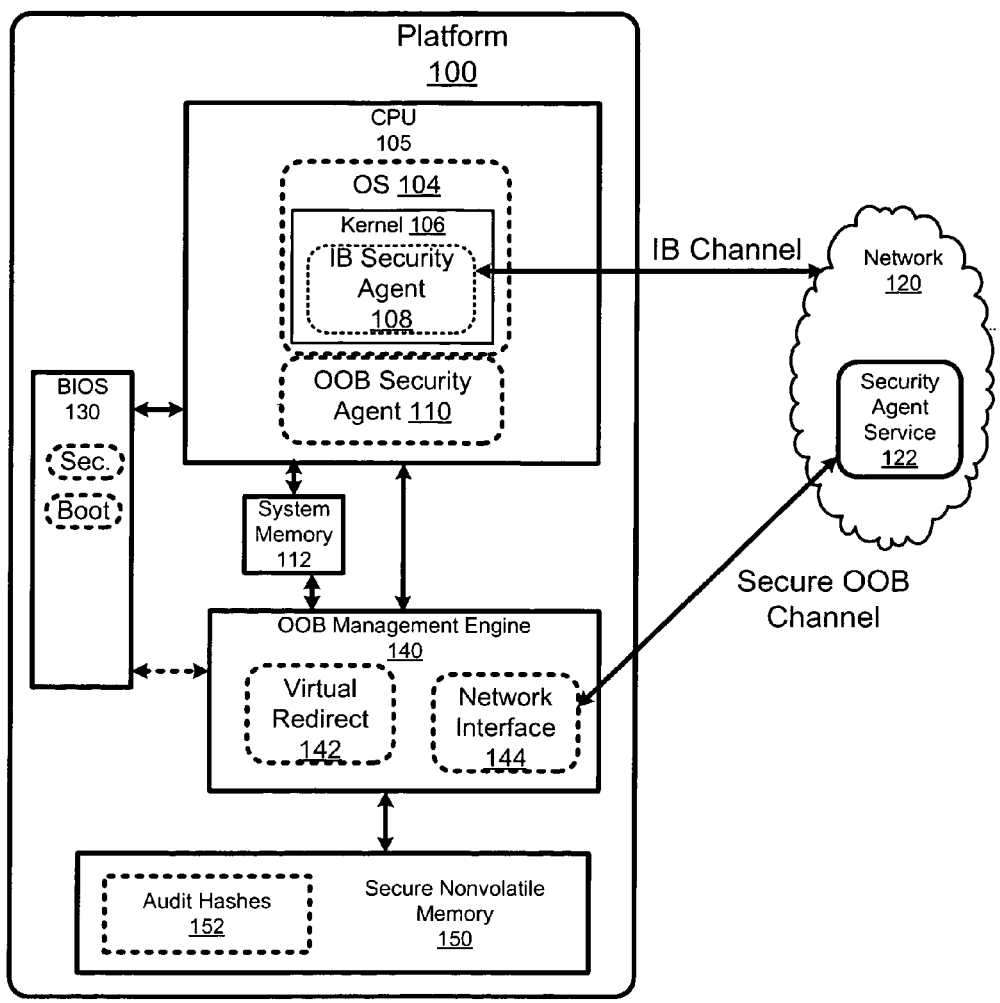
FIG. 1 is a block diagram of a platform with an anti-malware solution in accordance with some embodiments.

FIG. 1 shows a platform 100 with anti-malware protection in accordance with some embodiments. It comprises a CPU 105, system memory 112, BIOS memory 130, OOB (out-of-band) management engine 140, and secure non-vollatile memory 150, coupled as shown and communicatively linked with network 120 (e.g., TCP/IP network such as the world wide web). It should be appreciated that for simplicity, these blocks have been presented as distinct entities but in practice, depending on design concerns and the state of semiconductor technology, may be implemented as separate chips, in a single chip, or in any suitable combination of one or more devices.

The CPU 105 may be implemented with any suitable processor chip (or chips) including but not limited to single core devices, multi-core devices, and so-called system on chip (SOC) implementations. It uses system memory 112 (e.g., combination of cache memory, internal/external random access memory and hard-drive including flash hard-drive memory) to execute software code. When running, the CPU 105 may execute an operating system (OS) 104, such as a Microsoft Windows™ OS, Linux OS, or Apple™ OS, and an OOB security agent 110, which runs below the OS and is thus said to be out-of-band. The OS has a kernel (OS core), which may incorporate an in-band (IB) security agent 108. together, the IB and OOB security agents cooperate to protect the platform 100 from malware.

The IB security agent (or simply, IB agent) operates from within the OS kernel and interacts with the OOB security agent (or simply OOB agent) to protect the platform. The IB agent is protected by the OOB agent (when the OOB agent is active) and interacts with an online security agent service 122, which may verify that the IB agent application is in a correct state for the security agent service 122 to provision service-specific assets for the platform. The IB agent may operate in accordance with policies defined by the OOB agent and/or the security agent service. In turn, the IB agent gives context to the OOB agent, e.g., recognizing patterns, registry change requests, etc., which the OOB agent may use for defining or revising the policies.

With this platform model, the OS is not trusted, i.e., it is assumed to be otherwise accessible by malware. So, the IB agent operates in a distrusted, OS environment. On the other hand, in cooperation with the manageability engine, the OOB agent runs beneath the OS, e.g., in virtualized, trusted memory space that is not part of the OS memory space. It is implemented and controlled via the OOB management engine.

The OOB management engine may be implemented with any suitable out-of-band scheme. for example, it could be implemented with firmware that is part of a separate chipset function, e.g., manageability engine, or alternatively, it could be implemented in or as a service processor, e.g., that is part of a network interface controller (NIC). Being out-of-band (OOB), it is capable of operating even when the OS is not running.

In some embodiments, the OOB management engine 140, through the OOB agent, enforces page-based access control and monitoring policies for memory pages belonging to the protected IB agent 108 executing within the OS context. The OS is un-trusted in this model, so the IB agent is measured and protected by the OOB agent, which derives from the manageability engine. A mechanism of page-based protection is described in U.S. application Ser. No. 11/395,488, titled: INTRA-PARTITIONING OF SOFTWARE COMPONENTS WITHIN AN EXECUTION ENVIRONMENT, filed on Mar. 30, 2006, which is incorporated by reference herein.

The OOB security agent 110 may be provided to the manageability engine in any suitable manner. For example, it could come on a CD-ROM and stored, for example, in secure non-volatile memory 150, or it could be Part of firmware, incorporated into the manageability engine when it is made or at a later time. It could be self-launching, or it could be enabled and launched via the manageability engine 140 in response to a request from the security agent service 122.

In many cases, it will be loaded for CPU execution in the following manner Initially, the BIOS is launched and once it initial boot-up tasks are done, it hands off bot-up to the manageability engine, which then loads the OOB agent securely into memory (e.g., via a virtualization and/or other secure method outside of OS space). Once the OOB agent is loaded, it may then initiate the OS, itself, to load and launch.

In some embodiments, there may be a mechanism for verifying the integrity of the OOB code. for example, a checksum (or other suitable metric) may be stored in the CPU or BIOS and then verified by the CPU when the OOB agent is loaded for execution.

The OOB agent may also provide memory snapshots, e.g., to be stored in secure non-volatile memory 150 (e.g., hash audits), as well as events for areas of memory that are monitored based on policies from the in-band agent. The OOB agent also may help the in-band agent establish the areas that should be monitored by providing the information from specific CPU registers that are setup by the target OS environment.

The Security agent service may be implemented in any suitable way from an appropriate, accessible network server. It may be implemented as a remote (cloud) service where off-line anti-malware analysis may be performed on provided memory (e.g., system memory) snapshots. The service may also verify that the IB agent has been appropriately measured by the OOB agent through use of the secure OOB network channel to provision credentials that are protected by the OUB agent.

The secure OOB channel is used to connect the platform to the security agent service. It comprises the network interface 144 and virtual redirect blocks 142 in the manageability engine 140. The network interface 144 provides a network interface (as with a NIC) for the service 122 to communicate with the platform even when the OS is not active. It also allows the manageability engine 140 to communicate with the service 122 when a malware may have compromised the integrity of the IB channel.

The virtual redirect 142 provides a channel from the manageability engine 140 and/or service 122 to the CPU and to boot and BIOS functionality. So, for example, it may allow the manageability engine 140 and/or service 122 to emulate a CD Drive or serial link and implement a boot, with the OOB agent interjected as previously described. The network interface 144 allows for attestation from the IB agent that it is running protected. It also allows the service 122 to receive alerts from the IB agent if/when local IB and/or OOB agent analysis detects an issue that may need remediation. It also allows the service 122 to provision policies to the IB agent and facilitate remediation of the platform after the in-band analysis has been completed.

Figure 2:
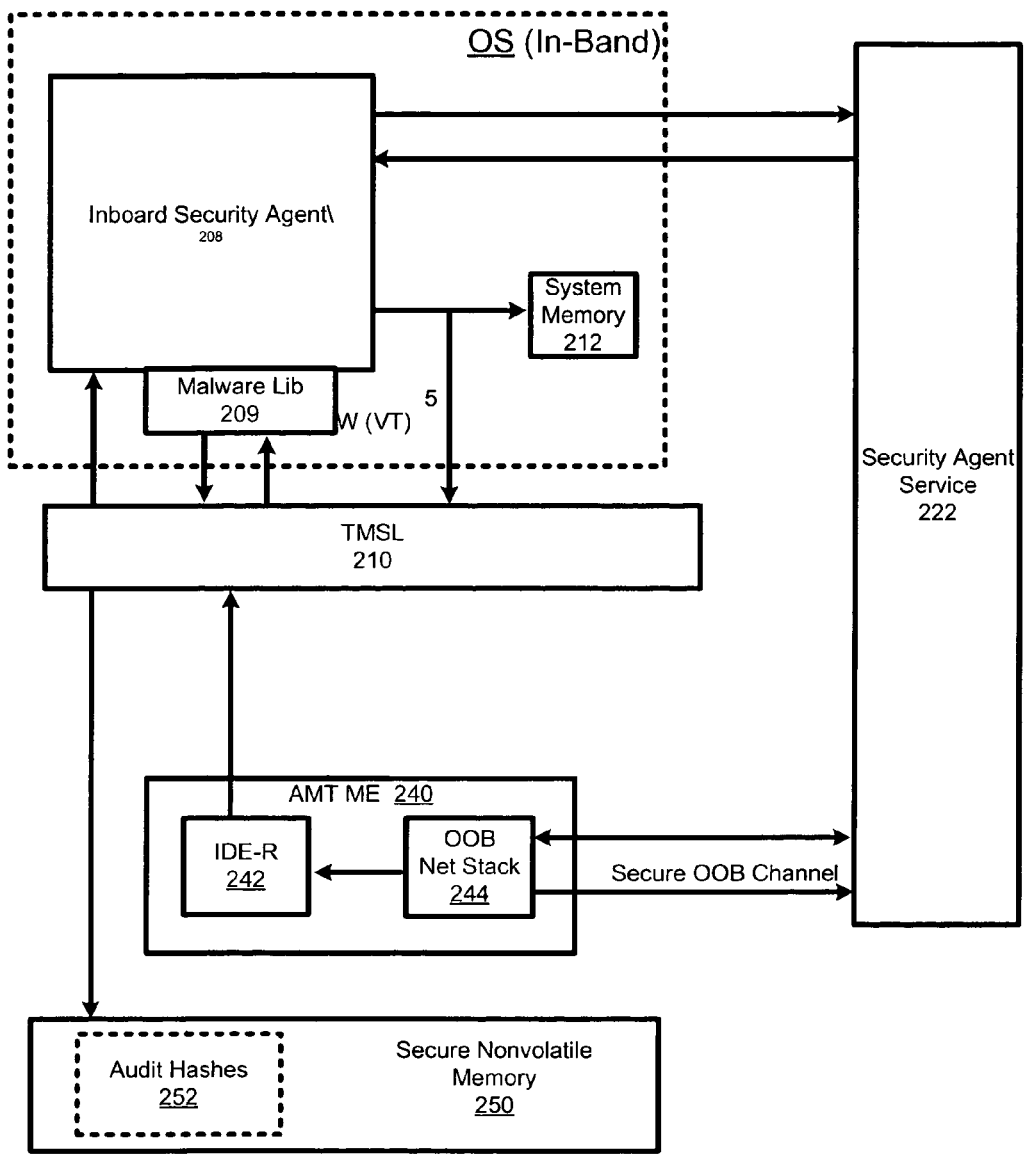
FIG. 2 shows a more particular implementation of the solution shown in FIG. 1.

FIG. 2 shows an exemplary implementation of the platform of FIG. 1 using Intel™ AMT (Active Management Technology), which may be part of Intel's vPro™ technology. For example, chipsets may include a manageability engine (ME) 240, which in turn, may include an IDE-R (IDE redirect) feature, along with an OOB net stack (network interface). It also may include a trusted memory services layer (TMSL), which may be used to implement the OOB agent in FIG. 1. Some CPUs may also include a TXT (trusted execution technology) capability, a hardware rooted signature checker that can be used to verify the integrity of the OOB agent (TMSL in this case) before it is launched.

The IDE-R enables network boot operations. It may be used to provide the TMSL for launch via a virtual media image to the local platform. (This may be needed only for the initial download.) In general, the IDE-R provides for redirect serial and IDE communications for a managed client from a management console regardless of the boot and power state of the managed client. The client need only have the AMT capability, a connection to a power source, and a network connection.

In some embodiments, the secure non-volatile memory may be implemented with an Intel™ AMT 3PDS (third party data storage) device. It may be used to store policies, as well as hashes of audit logs, created by the TMSL. A 3PDS is typically implemented with flash memory. It may be used to store logs to be sent back to the service 122.

Figure 3:
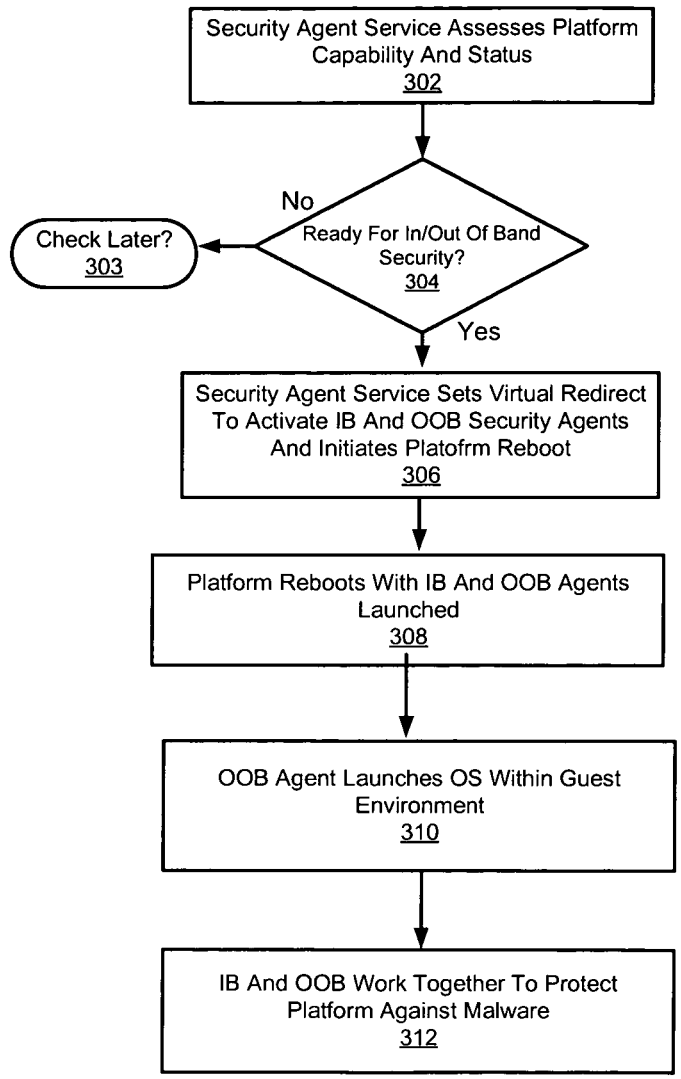
FIG. 3 is a flow diagram of a routine for implementing an anti-malware system in accordance with some embodiments.

FIG. 3 shows a routine for loading and launching an OOB agent from a online service. At 302, the service assesses platform's capabilities and status. The service may assess platform capabilities through a secure dialogue with the manageability engine.

At 304, it proceeds to 306 if the platform is suitable for IB and OOB security, as discussed above. Otherwise, it may check again at a later time 303.

At 306, the service 122, after downloading the software, if necessary, may initiate the service by rebooting the platform and setting a virtual redirect (IDE-R boot) option to active. The service provisions keys/policies for the OOB agent (e.g., TMSL). At 308, the platform is re-booted, causing the OOB and IB agents to launch. With such a boot, at 310, the OOB agent may launch the OS in a guest OS environment, where the IB agent is also launched. Finally, at 312, the running IB and OOB agents work with each other to protect the platform against malware attacks.

Figure 4:
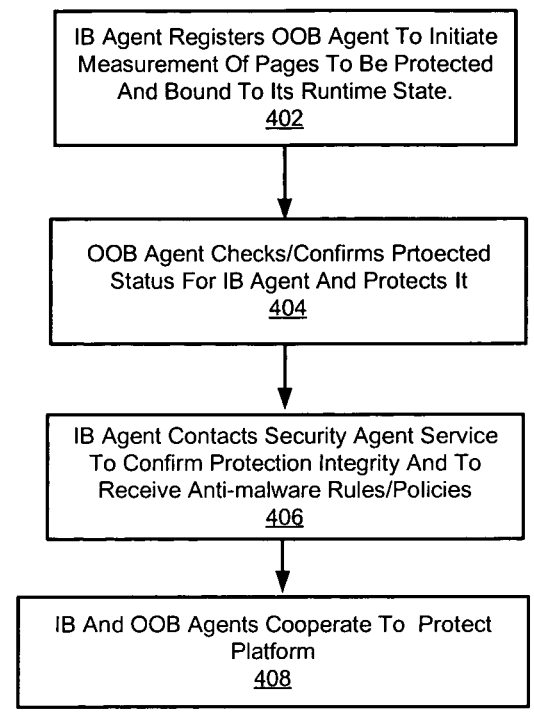
FIG. 4 is a flow diagram showing a routine for protecting a platform against malware in accordance with some embodiments.

FIG. 4 shows a routine for running malware protection using the IB and OOB agents. At 402, the IB Agent registers with the OOB Agent (e.g., TMSL) to initiate measurement of system memory pages it wants to protect and bind them to its runtime state.

At 404, the OOB agent, e.g., using a provisioned manifest, measures the IB agent and protects it. for example, it may perform page protection as described in the afor mentioned incorporated patent application entitled: "INTRA-PARTITIONING OF SOFTWARE COMPONENTS WITHIN AN EXECUTION ENVIRONMENT." The OOB Agent may measure and protect the pages that contain code and data for the IB agent, among other things. The IB agent may not have local knowledge of these protections and may only try to access services that are available to it. The OOB agent may also create protected memory channels with the IB security agent.

At 406, the IB agent may contact the service 122 to confirm protected operation. For example, it may do this via an OOB agent created quote (signed hash of the IB agent). The service can then provision anti-malware rules/policies (e.g., create or update them) to the IB agent. If the service can verify that the IB agent is protected by the OOB agent, the service may then provision (signed) rules into the protected IB agent via protected memory space (protected by the OOB agent). The OOB agent may also store (e.g., in secure non-volatile memory 150) these authentication tokens into a special protected storage area reserved for its own use.

At 408, the IB agent may use the OOB agent services to read memory or set memory event handlers with access permissions for a specific physical or virtual memory page. All accesses to the monitored memory could, for example, cause events to be reported via protected memory channels into the security agent. Unknown events or behaviors could cause the IB agent to take a memory snapshot via the OOB agent and save it, e.g., in protected non-volatile memory, with hashes and audits saved and made available for online service 122.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A computing platform, comprising:
    a CPU to execute an operating system (OS) having associated OS memory space; and
    a manageability engine operable when the operating system is not running, the manageability engine to provide an out-of-band (OOB) security agent to protect an in-band security agent in the OS memory space, the OOB security agent to run on the CPU beneath the OS, wherein the in-band security agent is to notify the OOB agent of possible malware activity.

2. The platform of claim 1, in which the OOB agent is to protect the IB agent from malware.

3. The platform of claim 1, in which the manageability engine comprises a network interface to provide a secure OOB channel to an external security agent service.

4. The platform of claim 1, in which the manageability engine is implemented in a chip with firmware for the OOB agent.

5. The platform of claim 1, in which the manageability engine is implemented in a network interface controller.

6. The platform of claim 1, in which the manageability engine comprises a virtual redirect, enabling a remote re-boot of the CPU to activate the OOB agent.

7. The platform of claim 1, in which the CPU has logic to validate the integrity of the OOB agent.

8. An apparatus, comprising:
    one or more chips with a manageability engine and non-volatile memory storing an out-of-band (OOB) security agent to run on a processor and to protect an in-band security agent running on the processor in an OS above the OOB agent, wherein the in-band security agent is to notify the OOB security agent of possible malware activity.

9. The apparatus of claim 8, in which the manageability engine comprises a virtual redirect function to reboot the platform in order to activate the OOB agent.

10. The apparatus of claim 8, in which the manageability engine comprises a network interface to provide OOB network connectivity to the platform.

11. The apparatus of claim 8, in which the OOB agent is to provide to the non-volatile memory hash audit data from the platform to be analyzed by a remote security service linked with the manageability engine via a secure OOB channel.

12. The apparatus of claim 8, in which the OOB agent is to run in a layer beneath a system operating system for the platform.

13. A system, comprising:
    a platform having a CPU with an associated OS and an out-of-band (OOB) capable manageability engine; and
    a remote security agent service to be linked to the platform via the manageability engine;
    wherein an OOB agent is to be executed outside of the OS to protect an in-band security agent running on the processor in an OS above the OOB agent, and wherein the in-band security agent is to notify the OOB agent of possible malware activity.

14. The system of claim 13, in which the remote service provides the OOB agent to the platform.

* * * * *